US007475467B2

(12) United States Patent
Murray et al.

(10) Patent No.: US 7,475,467 B2
(45) Date of Patent: Jan. 13, 2009

(54) ROTOR FOR A THRESHING SYSTEM OF AN AGRICULTURAL COMBINE AND METHOD OF MAKING THE SAME

(75) Inventors: Craig E. Murray, Rock Island, IL (US); Charles Linder, Flora, IL (US); Robert A. Matousek, Milan, IL (US); Mark S. Epperly, Sherrard, IL (US)

(73) Assignee: CNH America LLC, New Holland, PA (US)

( * ) Notice: Subject to any disclaimer, the term of this patent is extended or adjusted under 35 U.S.C. 154(b) by 15 days.

(21) Appl. No.: 11/726,007

(22) Filed: Mar. 20, 2007

(65) Prior Publication Data

US 2008/0234018 A1    Sep. 25, 2008

(51) Int. Cl.
*B21D 39/00* (2006.01)
*B23P 11/00* (2006.01)

(52) U.S. Cl. .......................................... 29/505
(58) Field of Classification Search ............. 29/895.22, 29/505, 407, 148.4, 891, 238, 234, 510, 506, 29/890.053; 384/565; 460/66, 64, 59, 68, 460/69, 65
See application file for complete search history.

(56) References Cited

U.S. PATENT DOCUMENTS

| | | | |
|---|---|---|---|
| 1,092,464 A | 4/1914 | Watson et al. | |
| 1,229,007 A | 6/1917 | Albro | |
| 2,429,293 A * | 10/1947 | Peck et al. | 29/895.22 |
| 4,178,966 A | 12/1979 | Savor et al. | 139/89 |
| 4,248,249 A | 2/1981 | Dunn et al. | 130/27 T |
| 4,624,184 A | 11/1986 | Katz et al. | 101/375 |
| 4,733,672 A | 3/1988 | Tophinke | 130/27 T |
| 4,754,537 A | 7/1988 | Lee | 29/148.4 |
| 5,085,131 A | 2/1992 | Barrett et al. | 92/169.1 |
| 5,177,854 A | 1/1993 | Herbert, Jr. et al. | 29/407 |
| 5,387,153 A * | 2/1995 | Tanis | 460/68 |
| 5,675,893 A | 10/1997 | Yamada et al. | 29/895.22 |
| 6,104,896 A | 8/2000 | Zaman et al. | 399/117 |
| 6,804,921 B2 * | 10/2004 | Neylon | 52/244 |
| 6,830,512 B2 * | 12/2004 | Tanis et al. | 460/68 |
| 7,110,693 B1 * | 9/2006 | Michlin et al. | 399/90 |
| 2004/0023703 A1 * | 2/2004 | Tanis et al. | 460/68 |
| 2004/0043803 A1 | 3/2004 | Lundstrom et al. | 460/59 |
| 2005/0020328 A1 | 1/2005 | Linder | 460/68 |

FOREIGN PATENT DOCUMENTS

DE    3733339    4/1989

* cited by examiner

*Primary Examiner*—Árpád Fábián-Kovács
(74) *Attorney, Agent, or Firm*—Michael C. Harms; John William Stader; Patrick M. Sheldrake (57) ABSTRACT

A rotor for a threshing system of an agricultural combine and method for making the same, including a body of simplified, three part press fit construction including an inlet segment, a main body segment having threshing elements therearound, and a bulkhead to be connected to a drive mechanism. The inlet segment, main body segment and bulkhead are configured so as to facilitate press fit assembly thereof concentric about a rotational axis about which the rotor will be rotated during operation, while also minimizing eccentricities of those components. As a result, the manufacture of the rotor is simplified by the elimination of the need for an internal skeleton structure and associated welds and/or fasteners.

23 Claims, 13 Drawing Sheets

(PRIOR ART)

ROTOR FOR A THRESHING SYSTEM OF AN AGRICULTURAL COMBINE AND METHOD OF MAKING THE SAME

TECHNICAL FIELD

This invention relates generally to a rotor for the threshing system of an agricultural combine, and a method of making the same.

BACKGROUND ART

Many agricultural combines use a rotary threshing or separating system. The system typically includes at least one rotor drivingly rotated within a perforated concave spaced radially outwardly thereof. The rotor will often have a frusto-conical inlet end having a helical flight or flights therearound for conveying a flow of crop material into a space between the rotor and the concave. The main body of the rotor will typically have one or more cylindrical or frusto-conical outer surface portions including threshing elements which protrude radially outwardly therefrom into the space and which are arranged in a pattern or array for conveying a mat of the crop material along a helical path through the space, while cooperating with features of the concave, e.g. bars or ribs, to separate larger components of the crop, namely crop residue commonly referred to as straw, which includes stalks, stems, cobs and the like, from the smaller grain and material other than grain (MOG). The straw is then typically propelled or carried rearwardly away from the threshing system for disposal, while the grain and MOG pass through the perforations of the concave to a cleaning system of the combine, typically located beneath the threshing system. Reference in this regard, Dunn et al. U.S. Pat. No. 4,248,249, and Tophinke U.S. Pat. No. 4,733,672, which illustrate representative prior art threshing system rotor and concave arrangements.

An important parameter for a successful threshing performance is the gap between the radial outer portions of the threshing elements, and the radial innermost features or portions of the surrounding concave. The setting of this gap is an operator function, and will typically be finely adjusted within a range of just a fraction of an inch or a few millimeters before or during operation to achieve a desired threshing capability or performance. Generally, if the gap is set too large, not enough grain will be separated from the straw, resulting in more grain loss. If the gap is too small, threshing quality may suffer, and in particular, the grain may be subjected to damage, particularly cracking, which is highly undesired in most instances. If there are irregularities in the outer cylindrical surface of the rotor on which the threshing elements are mounted, as the rotor is rotated past a particular region of the concave, the gap will vary. Also, if there is an eccentricity of the cylindrical surface, the gap will vary. And, if the rotor is not centered about the rotational axis thereof, during rotation the gap will vary. These conditions can also cause imbalance in the rotor, which can result in vibrations during rotation that can damage the rotor and other components of the threshing system, as well as other components of the combine, particularly at higher operating speeds. Vibration can also result in operator annoyance and discomfort.

The rotor is typically supported for rotation about a rotational axis extending through the center thereof, by a bearing on the inlet end, and a drive mechanism on the opposite end. The main body of the rotor is typically of riveted or welded sheet metal, and may include an internal support skeleton, for instance, comprising stiffening ribs or bulkheads, and a rear bulkhead which is connected to the drive mechanism. A problem that can be encountered with this construction is that, when the rotor is manufactured, it may have eccentricities, for instance, as a result of warpage from welding, uneven stress distribution, material variances, poor alignment during assembly, and the like. As another problem, in some common constructions the rear bulkhead is connected to the rear of the main body with fasteners around the circumference thereof, which has been found to allow water to enter the hollow interior of the rotor, which can cause imbalance during rotation, and corrosion.

Accordingly, what is sought is a rotor which, in operation, avoids one or more of the problems set forth above, particularly irregularities and eccentricity in the outer surface of the rotor and water collection, and an improved method for making the same which is simple and economical.

SUMMARY OF THE INVENTION

What is disclosed is a rotor for a threshing system of an agricultural combine which avoids one or more of the problems set forth above, particularly irregularities and eccentricity in the outer surface of the rotor and water infiltration, and a method for making the same which is simple and economical.

According to a preferred aspect of the invention, the body of the rotor is of simplified, three part press fit construction including an inlet segment to be disposed in an inlet region of the threshing system, a main body segment which will incorporate threshing elements therearound for performing the threshing function, and a bulkhead to be connected to a drive mechanism operable for rotating the rotor. The inlet segment, main body segment and bulkhead are configured so as to facilitate press fit assembly thereof concentric about a rotational axis about which the rotor will be rotated during operation, while also minimizing eccentricities of those components. Thus the manufacture of the rotor is simplified by the elimination of the need for an internal skeleton structure and associated internal welds and/or fasteners.

The inlet segment can be of a desired outer shape, such as the well-known tapered shape now commonly used. This tapered shape outer surface portion is preferably centered about the rotational axis of the rotor and narrows in a first axial direction to an element such as a stub shaft for supporting the inlet end of the rotor for rotation about the axis. The tapered shape is preferably, but is not limited to, a frusto-conical shape, and the surface includes a mounting element or elements for supporting one or more flights in a helical pattern therearound. The inlet segment has a peripheral lip extending around the axis and in an opposite second axial direction from a base of the tapered outer surface portion. The lip is of rigid construction, and is concentric or centered with the tapered outer surface portion about the rotational axis. The lip is configured to be press fit with the main body segment, and includes an axially extending tapered peripheral surface portion therearound for this purpose. The tapered peripheral surface portion has a predetermined overall transverse dimension through the rotational axis, at an axial location thereof, which is preferably about axially midway along the taper of the surface.

The main body segment is preferably a tubular member having an outer surface which in a preferred embodiment is cylindrical, and supports an array of threshing elements therearound, the body segment having a first open end portion and a second open end portion. The first open end portion includes a peripheral surface therearound configured and sized to be press fit to the tapered peripheral surface of the lip of the inlet segment concentric about the rotational axis. The open end portion of the tubular main body segment is additionally configured to be sufficiently compliant or conformable to the more rigid lip of the inlet segment, such that when press fit together, the lip will act essentially as a forming or shaping mandrel for the end of the main body segment, the end portion of the main body segment will conform in shape to the transverse shape (preferably round) of the lip and will have an overall transverse dimension through the rotational axis corresponding with that portion of the lip, which dimension is controllable by the extent to which the main body segment is press fit to the inlet segment. In this latter regard, it is anticipated that the transverse dimensions and shapes of the open ends of different main body portions before being press fit with the inlet section will typically vary, as a result of a variety of causes, which can include material variances, manufacturing tolerances, stress, and the like, while the transverse dimension and shape of the lip will be substantially more precise and consistent, as a function of its shape and sized, and that its manufacture can be more precisely controlled. For instance, some body segments are likely to be larger than a nominal transverse dimension, and some smaller, and some will have some degree of misshapenness, such as eccentricity.

As another aspect of the invention, the tapered peripheral surface of the lip and a surface of the open end of the main body segment which is to be press fit thereto are of sufficient axial length so as to be capable of being press fit together to a variable extent as required to achieving the desired transverse dimension and shape for that end of the main body segment, and such that the main body segment will be closely concentrically aligned with the tapered outer surface portion of the inlet segment about the rotational axis.

The bulkhead to be press fit with the opposite second open portion of the main body segment is preferably a disk shaped element including an outer peripheral skirt extending around a central hub having a central axis therethrough. The hub is configured for connection with a drive mechanism operable for rotating the bulkhead. The skirt is configured so as to be capable of being press fit to the second open end portion of the main body segment. According to one preferred embodiment, the skirt is of sufficiently rigid construction so as to be capable of sizing and shaping the second end portion of the main body segment when press fit thereto, in the same manner done by the inlet segment. In an alternative embodiment, the skirt is configured or supported so as to be uniformly deformable or compliant in the radial direction to a limited extent. This capability has utility wherein it is permissible or desired to have a greater capability for press fitting the bulkhead to a specified axial location, i.e., in relation to the inlet segment or another reference for establishing the length of the rotor, and can provide some compliance to the end of the main body segment, for achieving a particular fit, and wherein it is anticipated that there will be some variations in transverse dimensions from one main body segment to another, due to manufacturing tolerances, and the like as noted above. In either instance, the skirt and the end of the main body segment are brought into matching shape, such that bulges, depressions and other irregularities and eccentricities that can result from using fasteners for attachment, are eliminated.

The skirt has a peripheral surface therearound for engaging an opposing surface extending around the open end of the main body segment, which peripheral surface preferably has an axially extending tapered portion therearound having a predetermined overall shape (preferably round), and a predetermined transverse dimension through the axis of the hub for facilitating the press fitting thereof to the main body segment. This transverse dimension can be the same or nearly the same as that of the tapered surface of the lip of the inlet segment for a main body segment having a cylindrical shape, or otherwise having the same size open end portions.

According to a preferred method of the invention, during the press fitting, the bulkhead will be held in axial alignment with the inlet segment, such that the main body segment and axis of the hub of the bulkhead are coaxial with the rotational axis. Further, the transverse dimensions of the second open end portion of the main body segment and the skirt of the bulkhead in its free state, and the force required for achieving the press fit, will be sufficient such that a force of several thousand pounds, and preferably of about 10,000 pounds or more, will be required. The components of the rotor can then be fixed in position in a suitable manner, such as using welding, soldering, adhesives or the like.

According to still another preferred aspect of the invention, the inlet segment and/or the bulkhead can be manufactured, respectively, using a spin forming process, for optimal roundness and dimensional control. The center hub is preferably configured to include an array of bolt holes for mounting to a drive operable for rotating the rotor about the rotational axis, the hub being relatively thick and robust for this purpose. In the embodiment wherein the bulkhead is to be capable of conforming more to the end of the main body segment, the bulkhead preferably thins out toward the skirt, which is sufficiently thin, and is shaped for providing the desired deformability or compliance, yet which is sufficiently strong so as to provide the desired shaping capability. Axial slots or other weakening features can be provided in the skirt to achieve a desired degree of conformability.

DETAILED DESCRIPTION OF THE INVENTION

Figure 1:
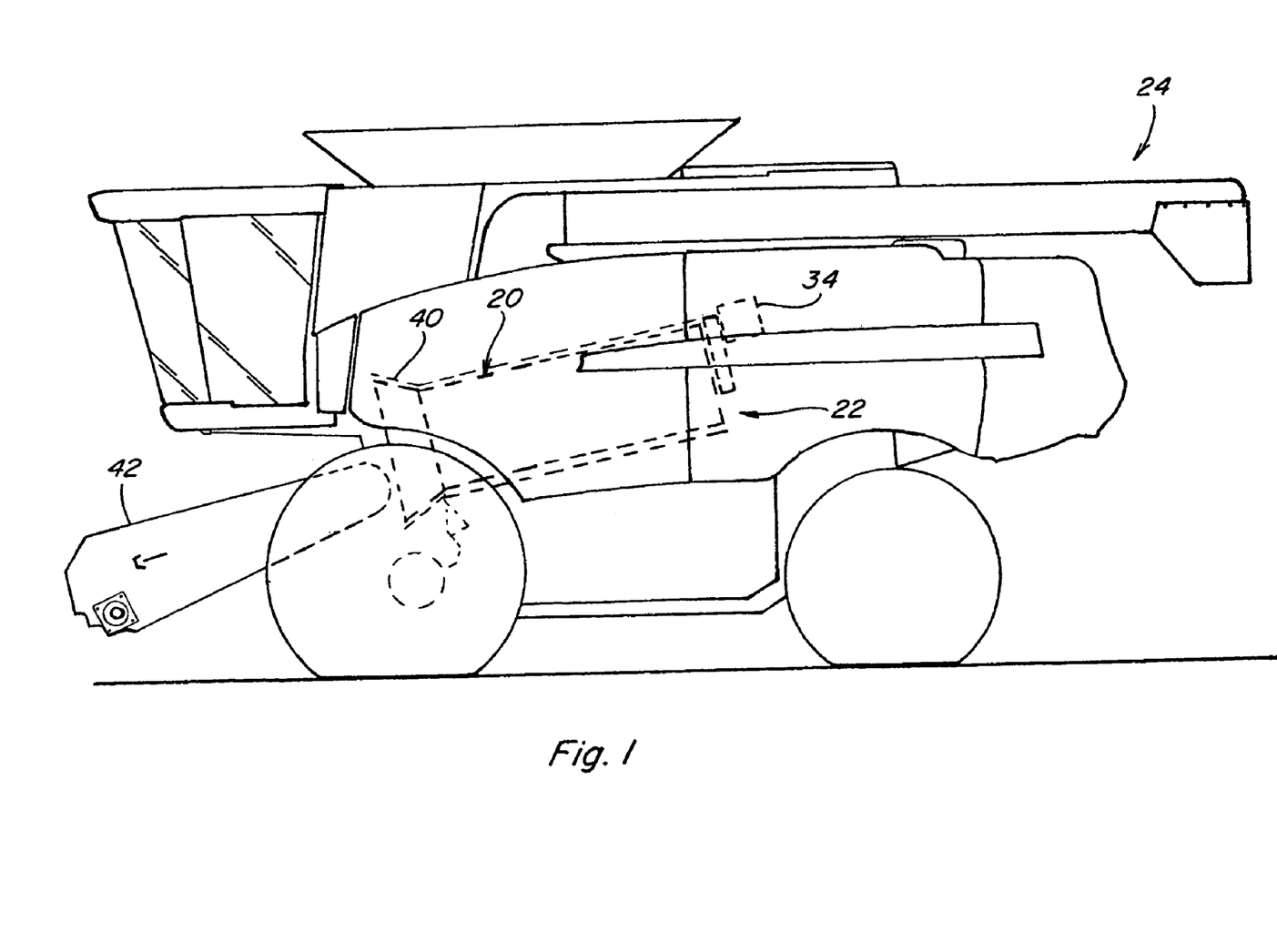
FIG. 1 is a side view of an agricultural combine having a threshing system including a rotor according to the present invention.

Turning now to the drawings wherein aspects of a preferred embodiment of a rotor 20 and method of making the same according to the present invention are shown, in FIG. 1, rotor 20 is shown in a threshing system 22 of a representative agricultural combine 24. Agricultural combine 24 is representative of an axial flow type combine including a single, fore and aft extending rotor, but it should be understood that it is contemplated that rotor 20 and the method of the invention can likewise be used with rotors of other types of combines, including, but not limited to, conventional types wherein one or more rotors of the invention will be mounted in a transverse orientation within a body of the combine.

Figure 2:
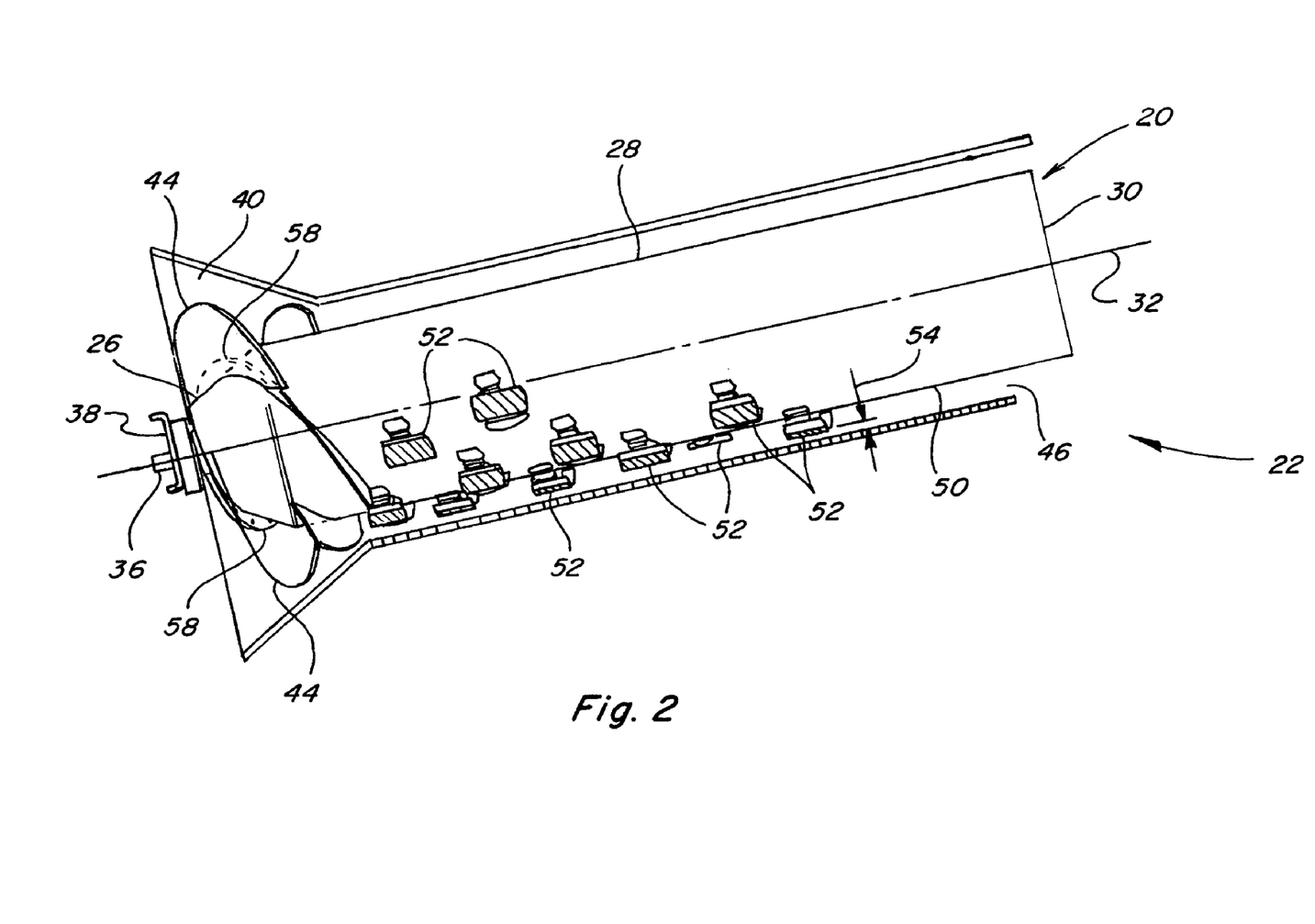
FIG. 2 is a side view of the rotor of the invention in association with a concave of the threshing system, shown in cross section.
Figure 3:
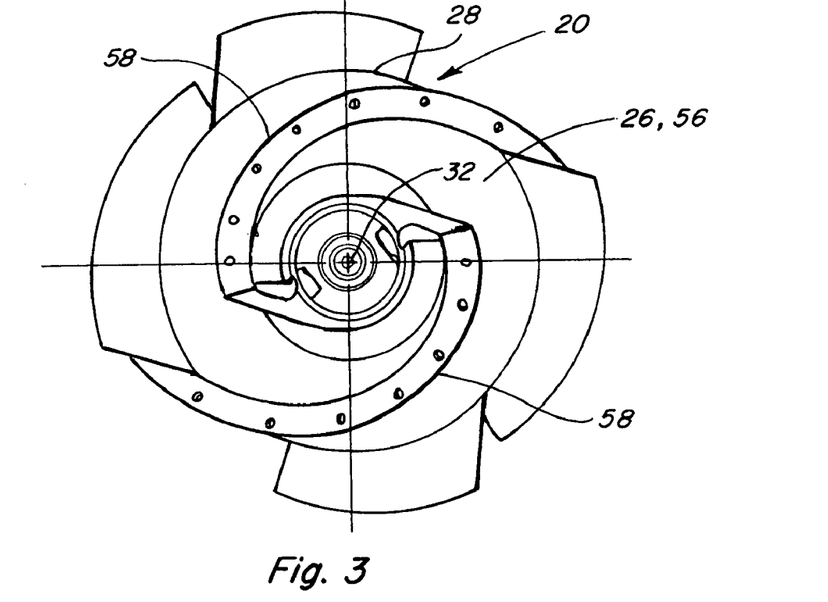
FIG. 3 is a front end view of the rotor.
Figure 4:
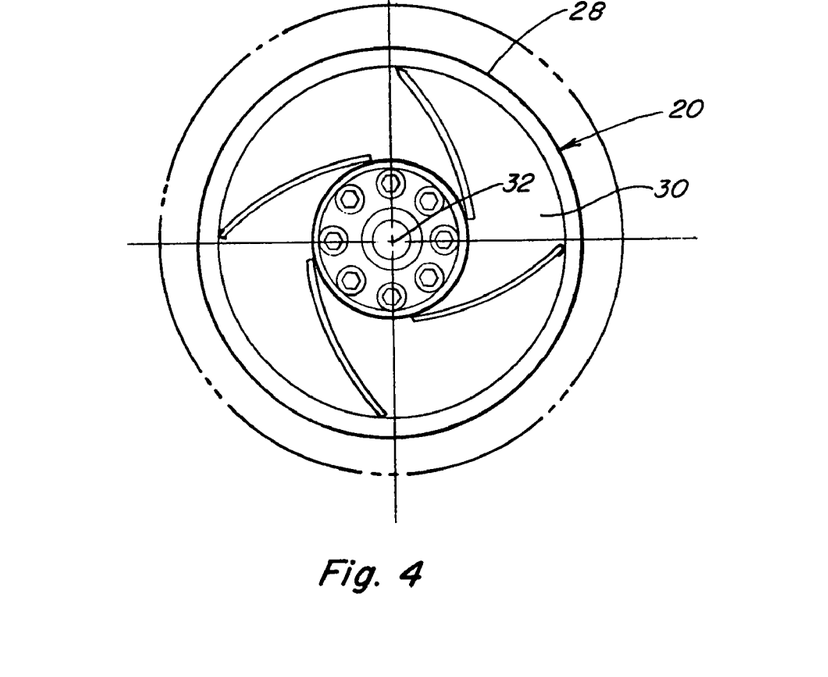
FIG. 4 is a rear end view of the rotor.
Figure 5:
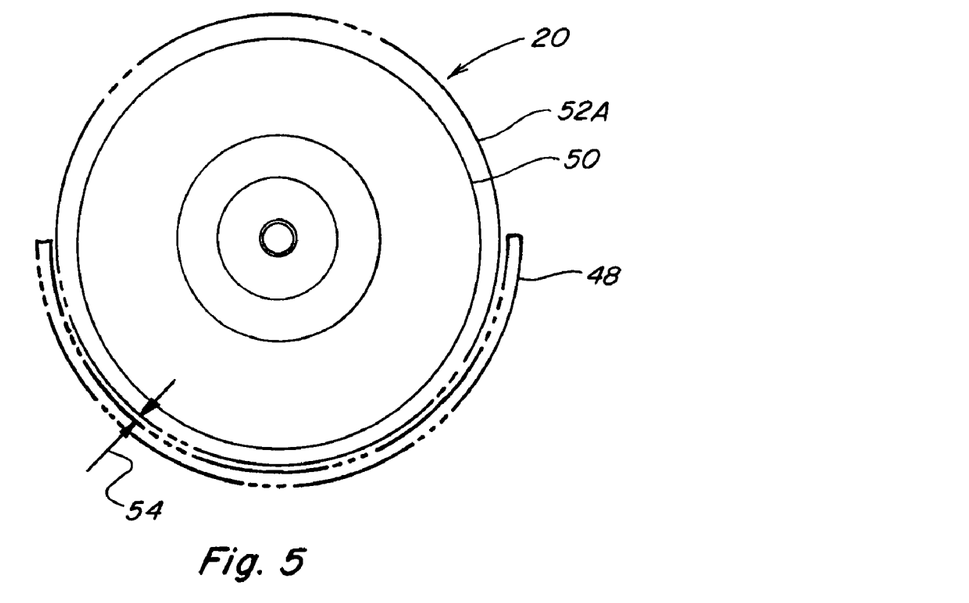
FIG. 5 is an end view of the rotor and concave.

Referring also to FIGS. 2, 3 and 4, rotor 20 generally includes an inlet segment 26 which is forwardly located in this application; a main body segment 28, and a bulkhead 30, which is rearwardly located. Rotor 20 is supported for rotation about a fore and aft extending inclined rotational axis 32, as driven by a drive mechanism 34 rotatably drivingly connected to bulkhead 30 at the rear end of the rotor. Inlet segment 26 includes a forwardly extending stub shaft 36 supported on a hanger bearing assembly 38 for this purpose. Inlet segment 26 is disposed within a frusto-conical shaped inlet chamber 40, into which harvested crop material is fed from a feeder 42 of combine 24. The crop material is harvested by a header (not shown) mounted on the forward end of feeder 42 and operable for cutting crops from a field as combine 24 is driven forwardly thereover, in the well-known manner.

Inlet segment 26 includes a pair of diametrically opposed helical flights 44 extending therearound and operable during the rotation of rotor 20 for conveying the crop material rearwardly and into a space 46 extending around main body segment 28. Space 46 is defined by an inner circumferential surface of a concave 48 extending circumferentially at least partially around an outer circumferential surface 50 of main body segment 28. A plurality of threshing elements 52 are mounted in a generally helical array around surface 50 of main body segment 28, and are operable during the rotation of the rotor for conveying the crop material through space 46. Threshing elements 52 include features which, in combination with features of concave 48, operate to thresh or separate smaller elements of the crop material including grain from larger elements, namely stalks, cobs, leaves and the like. The smaller elements including the grain, then fall through spaces through concave 48 to a cleaning system (not shown) of the combine for further processing. The straw and other larger elements are continued to be conveyed through space 46, and are propelled rearwardly from the threshing system for disposal, in the well known manner.

Referring also to FIGS. 5, 6, 7 and 8, the radial outer portions of threshing elements 52 (which circumscribe a circle denoted by a circle 52A in FIGS. 5 and 7) and the inner circumferential surface of concave 48 are separated by a gap 54, the width of which is a critical parameter in the quality of the threshing. Gap 54 will be set for a particular grain size, and setting gap 54 larger will typically result in a less aggressive threshing action so as to allow more grain to remain with the straw and other large elements thereby decreasing grain yield. Setting gap 54 smaller will effect more aggressive threshing, which can result in damage to the grain, particularly cracking. It is therefore typically desired to set gap 54 very precisely within a few millimeters or a small fraction of an inch for a particular harvesting environment.

Figure 7:
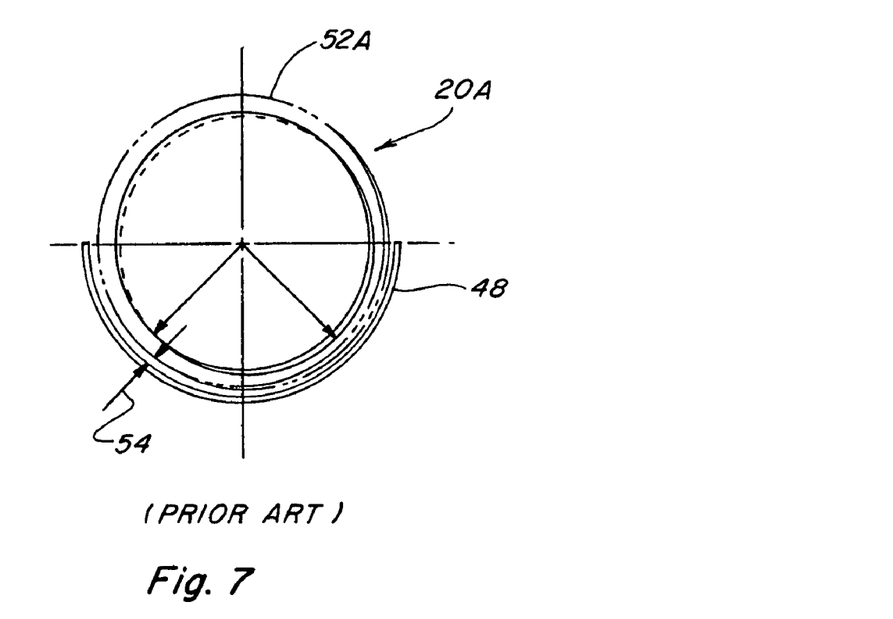
FIG. 7 is an end view of a prior art rotor and concave, illustrating effects of eccentricities thereof.
Figure 8:
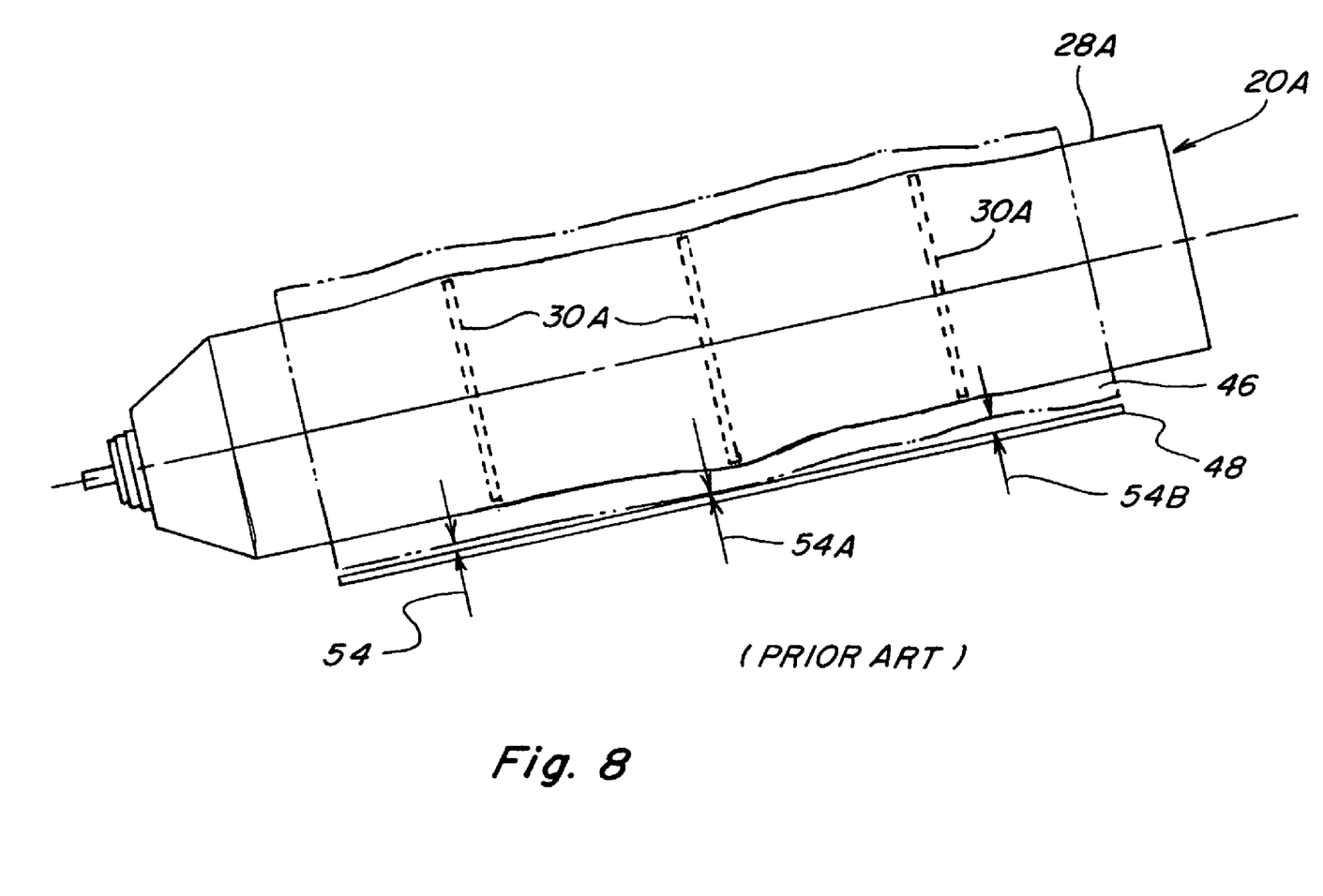
FIG. 8 is a side view of the prior art rotor and concave of FIG. 7.

A problem that has been observed with prior art rotor constructions, however, is that, if the rotor, as represented by prior art rotor 20A in FIGS. 7 and 8, or a portion or region thereof, particularly the outer surface of the main body segment thereof, is out of round, or eccentric, then space 46 will vary in radial extent, and the radial position of any threshing elements 52, will differ from the radial positions of others of the threshing elements 52 at other locations, such that the gap 54 will correspondingly vary at different locations along the length and/or around the circumference of main body segment 28 during the rotation of the rotor, as illustrated by the differences between gaps 54A and 54B. The amount of the variance in gap 54 will be a function of factors such as the degree of out of roundness or eccentricity. Such out of roundness or eccentricity can result from the manufacture and construction of the rotor. As an example of a known prior art rotor construction that can suffer from such problems, rotor 20A is illustrated in FIG. 8 as including a main body segment 28A having spaced internal bulkheads 30A, which can be out of round, have different diameters, and/or be misaligned axially during manufacture, resulting in eccentricities, misalignment, and/or out of roundness of the rotor, as shown. Rotors, such as rotor 20A, additionally present manufacturing challenges, i.e., complexity, alignment, access for and heat induced stress from welding, fastening fasteners, and the like, due to the internal location of bulkheads 30A.

Referring also to FIGS. 9, 10, 11, 11A, 12, 13, 14, 14A, 14B, 15, 16 and 17, aspects of the method of making a rotor and representative rotor 20 of the invention are shown, for reduce the number and complexity of components of the rotor, and providing a simplified assembly involving press fitting together of the components in an axially aligned manner, to eliminate one or more of the challenges and problems just discussed. More particularly, the body of the rotor 20 is of simplified, three part press fit assembly including inlet segment 26 to be supported by a hanger bearing assembly 38 in inlet chamber 40 of the threshing system (FIG. 2), main body segment 28 which will incorporate threshing elements 52 therearound (also FIG. 2) for performing the threshing function in conjunction with concave 48 as just discussed, and bulkhead 30 to be connected to drive mechanism 34 (FIG. 1) operable for rotating rotor 20. Inlet segment 26, main body segment 28 and bulkhead 30 are configured so as to facilitate press fit assembly thereof concentric about rotational axis 32, while also minimizing out of roundness and eccentricities of those components. Thus, the manufacture of rotor 20 is simplified by the elimination of the need for an internal skeleton structure (e.g., internal bulkheads 30A and 30B) for holding the components in alignment.

Figure 6:
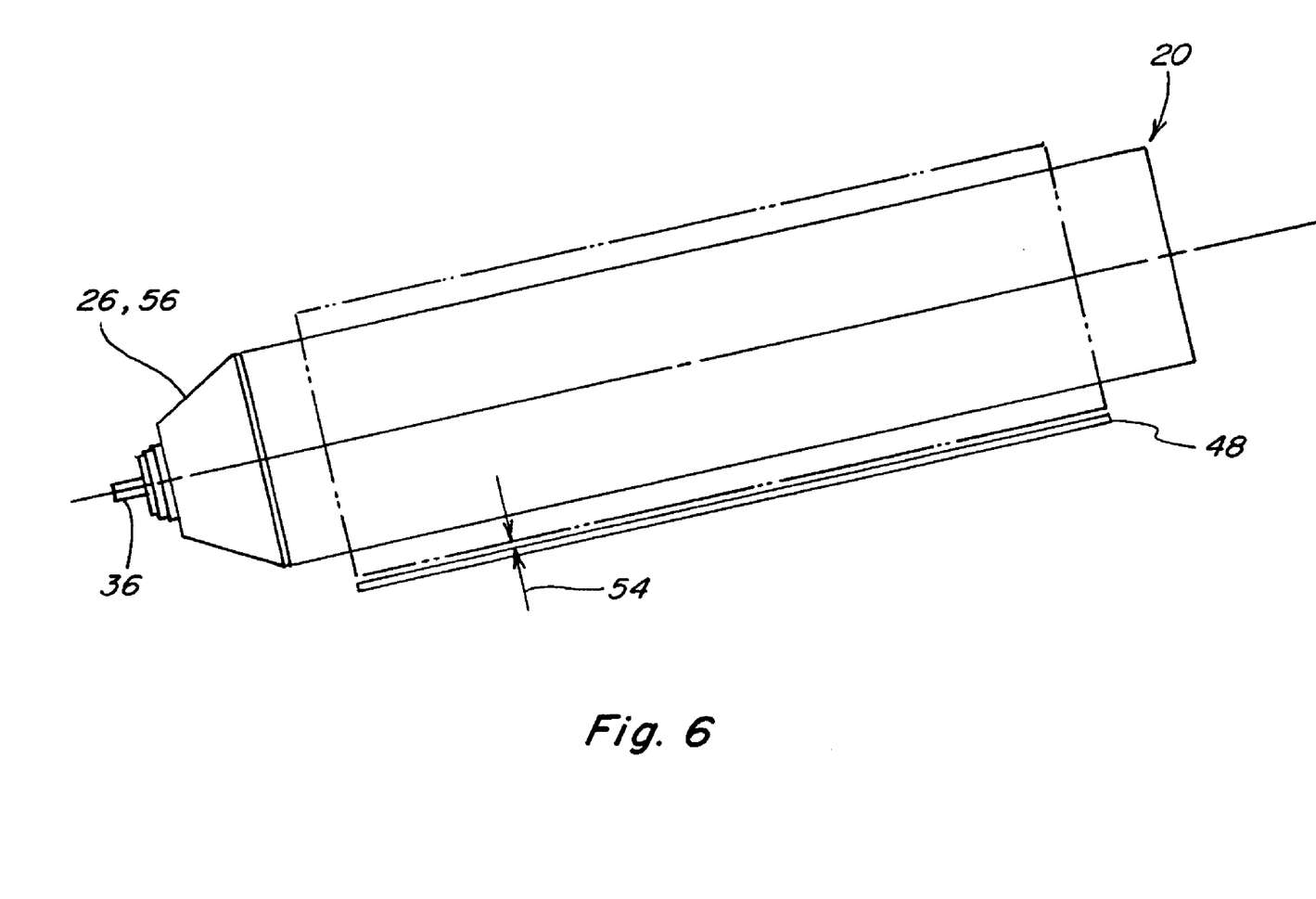
FIG. 6 is a side view of the rotor and concave.
Figure 9:
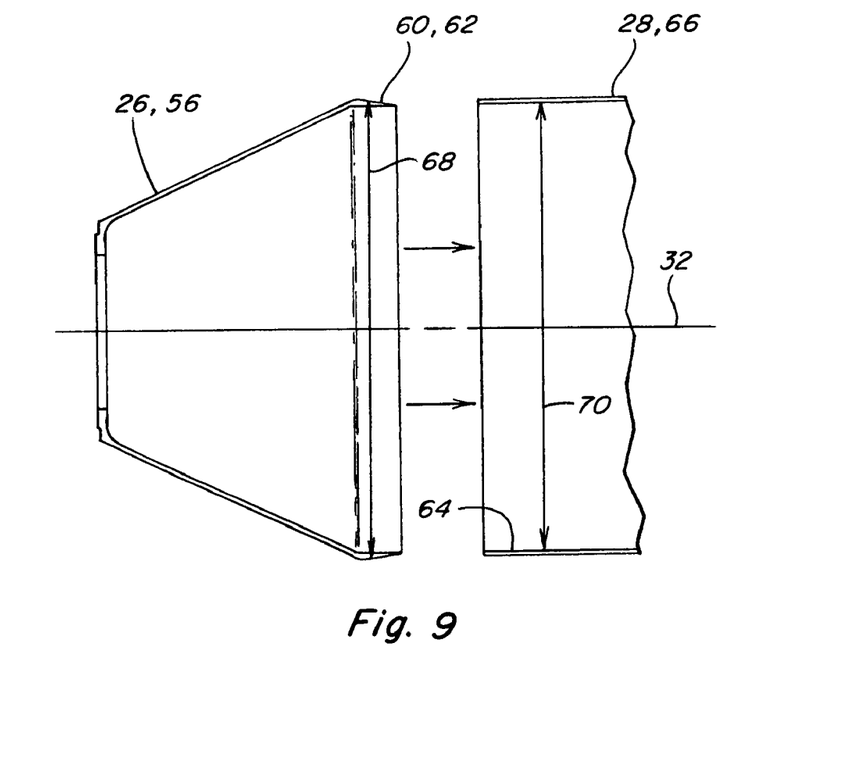
FIG. 9 is a fragmentary side view showing assembly of a front inlet segment and a body segment of the rotor of the invention.
Figure 10:
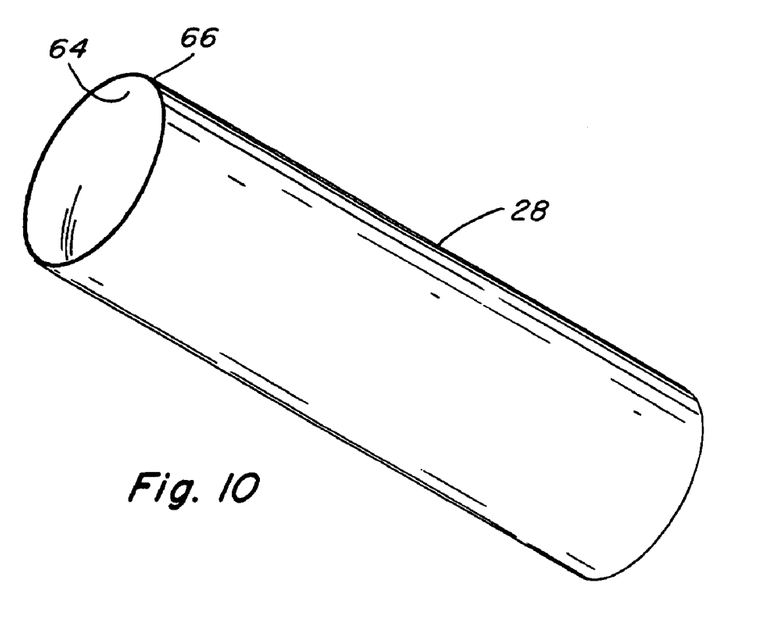
FIG. 10 is a perspective view of a tubular body segment of the rotor of the invention.
Figure 11:
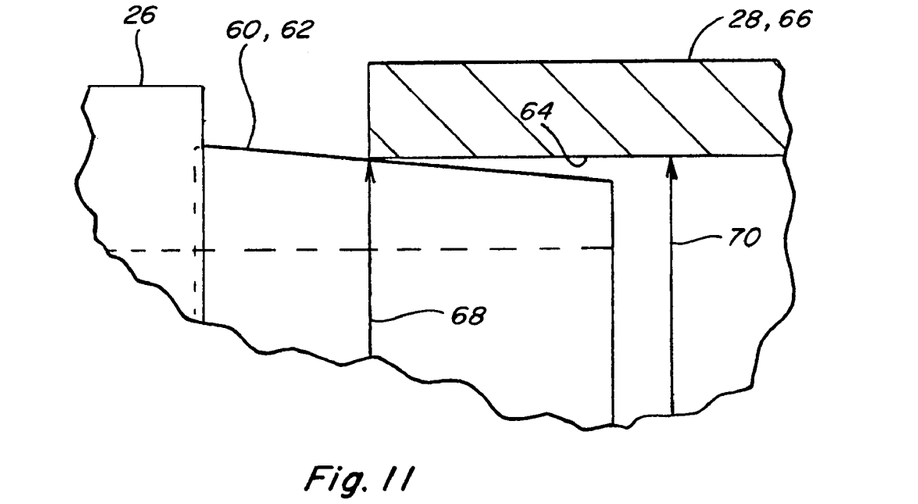
FIG. 11 is a fragmentary side view showing press fit assembly of a front inlet segment and the body segment of the rotor.
Figure 11A:
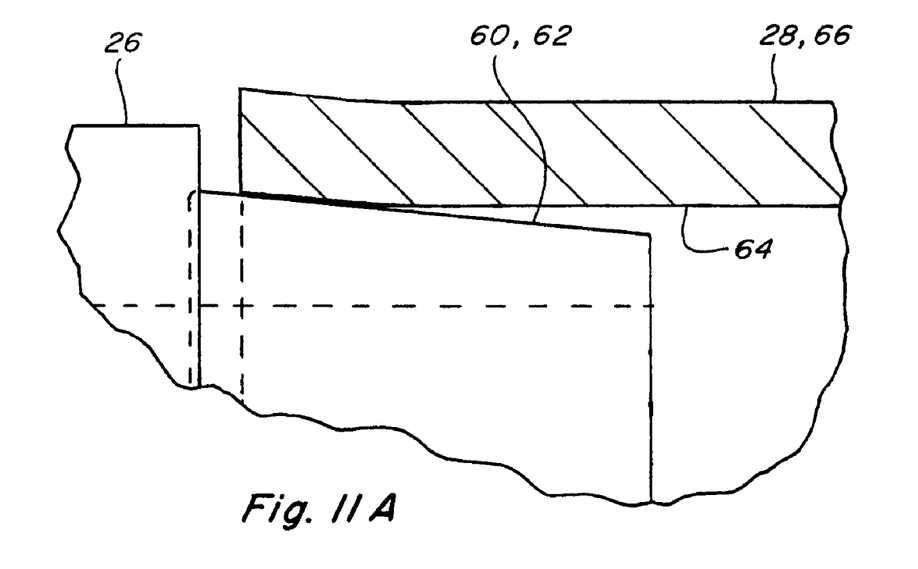
FIG. 11A is another fragmentary side view showing the front inlet segment and the body segment of the rotor press fit together.
Figure 12:
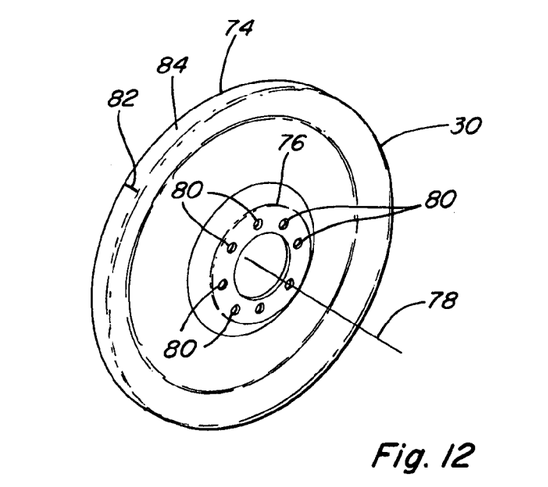
FIG. 12 is a perspective view of bulkhead of the rotor of the invention.

Referring more particularly to FIGS. 3, 6 and 9, inlet segment 26 can have an outer surface portion having a desired outer shape, such as the well-known tapered shape illustrated, which is a frusto-conical shape centered about rotational axis 32. Surface portion 56 is oriented so as to narrow toward stub shaft 36, which can be assembled to inlet segment in a suitable manner such as by press fit, welding, solering and/or fasteners or adhesive. Outer surface portion 56 includes mounting elements 58 therearound (FIGS. 2 and 3) for supporting helical flights 44 (FIG. 2). Inlet segment 26 additionally has a peripheral lip 60 which is of rigid construction, concentric or centered with outer surface portion 56 about rotational axis 32, but extending axially in the opposite direction. Lip 60 includes an axially extending tapered peripheral surface portion 62 therearound configured for press fitting with a peripheral surface 64 on a first peripheral end portion 66 of main body segment 28. Tapered surface portion 62 is preferably a radially outwardly facing circumferential surface, and peripheral surface 64 is preferably a radially inwardly facing circumferential surface, as shown in FIGS. 9, 10, 11 and 11A, although it is contemplated that these surfaces could be reversed. Tapered surface portion 62 has a predetermined overall transverse dimension through axis 32, denoted by the number 68, at an axial location therealong which is preferably about axially midway along the taper of the surface, and which dimension is selected so as to correspond to a nominal transverse dimension for peripheral surface 64, denoted by number 70. This is best illustrated in FIGS. 9 and 11. Here, it should be understood, as noted above, that it is expected that the actual transverse size and shape of surfaces 64 of different main body segments will vary, as a result of manufacturing, material and other variances. To accommodate this, tapered peripheral surface portion 62 of lip 60 has a sufficient slope, and, with peripheral surface 64 of open end portion 66, provides sufficient axial length of engagement, to provide a capability to press fit the surfaces together to a variable extent as required to achieving the desired transverse dimension for that end of main body segment 28 and the desired shaping and sizing of the main body segment.

Main body segment 28 is preferably of tubular construction, outer surface 50 preferably having a straight cylindrical shape, although it is likewise contemplated that it could have a variety of other shapes, such as, but not limited to, a stepped cylindrical shape having sections of progressively smaller or larger diameter, or a tapered shape. At least first open end portion 66 is constructed so as to be compliant or conformable to lip 64, particularly circumferentially, as they are press fit together, such that open end portion 66 will conform to the shape of lip 60.

Figure 15:
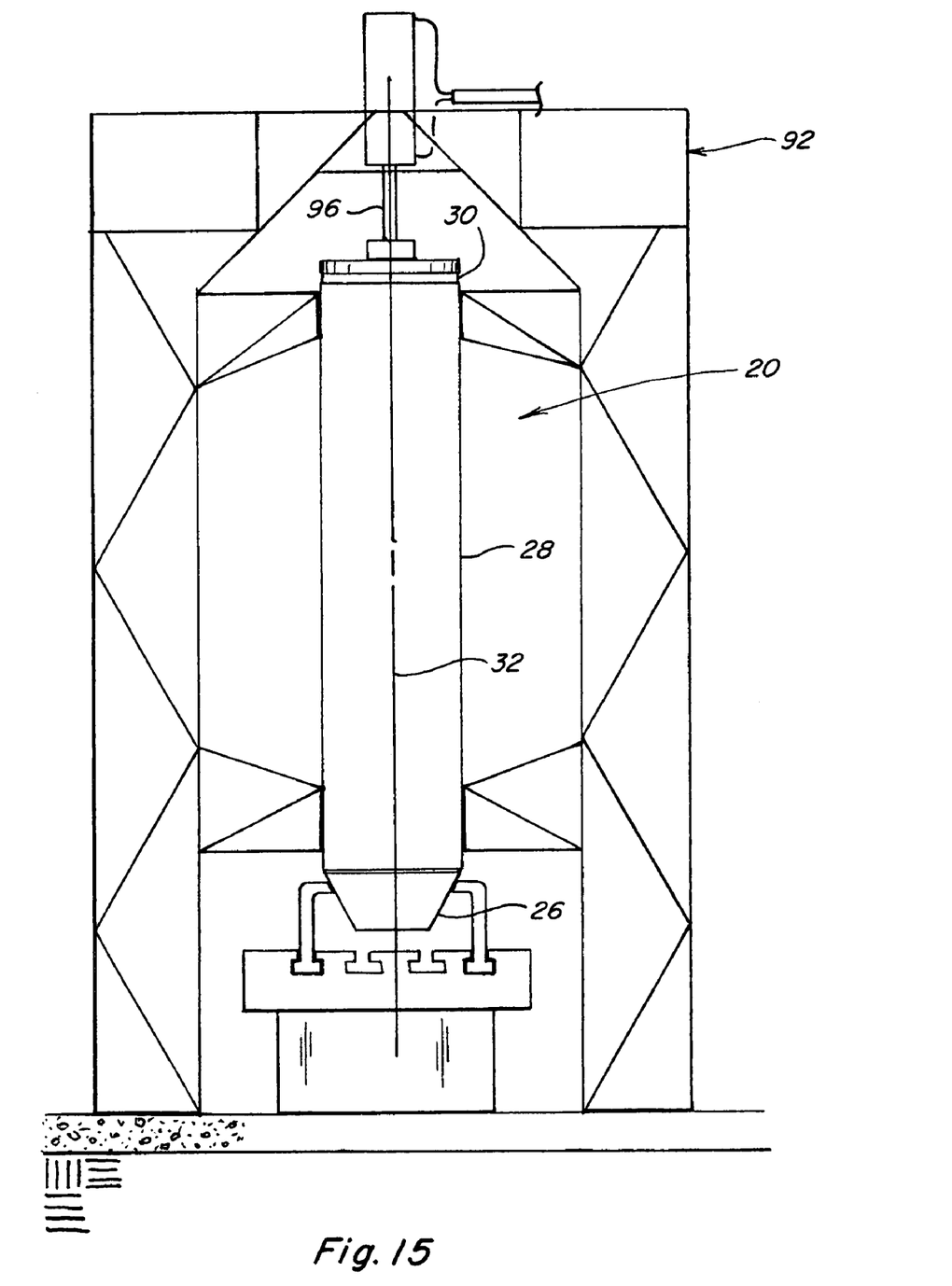
FIG. 15 is a side view showing a representative manner of press fit assembly of the rotor of the invention.
Figure 16:
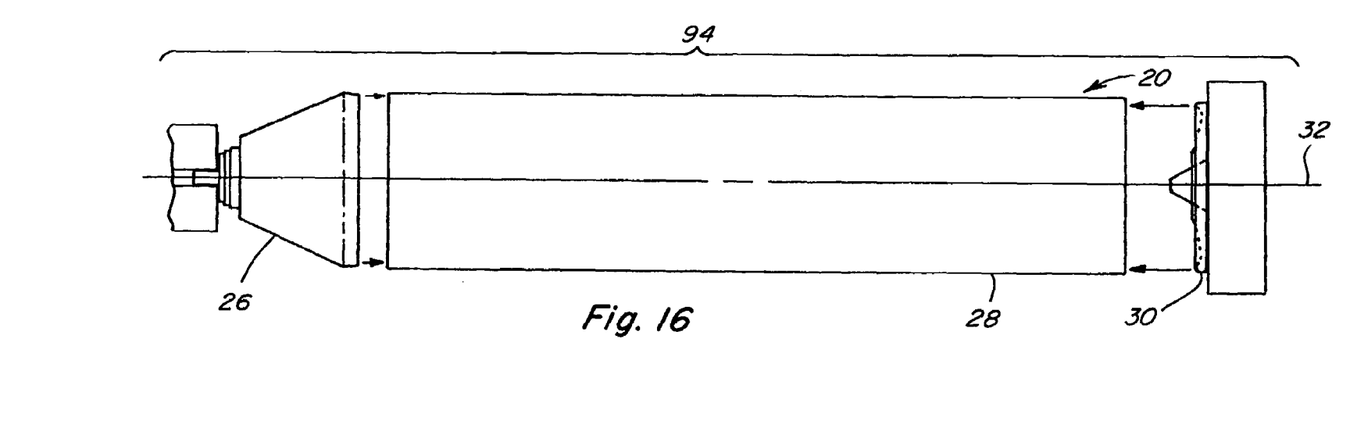
FIG. 16 is a side view showing another representative manner of press fit assembly of the rotor of the invention.

During the press fitting step, as best shown in FIGS. 15 and 16, inlet segment 26 and bulkhead 30 are preferably simultaneously press fit to opposite ends of main body segment 28 using a suitable device as will be explained, while all of the components are held or restrained concentric about axis 32, such that when released, all will remain concentric with the inlet segment, for welding or other permanent holding in place. Essentially in this regard, it has been found that lip 60 acts essentially as a forming or shaping mandrel for end portion 66 of main body segment 28 and holds it in alignment with axis 32, and the stresses introduced to the assembly by the press fitting, and the presence and configuration of bulkhead 30, serve to retain or hold the alignment.

Referring more particularly to FIGS. 12, 13, 14, 14A and 14B, bulkhead 30 is configured to be cooperatively received and press fit in a second open portion 72 of main body segment 28. Bulkhead 30 is preferably a disk shaped element including an outer peripheral skirt 74 extending around a central hub 76 having a central axis 78 therethrough. Hub 76 is configured for connection with drive mechanism 34 operable for rotating rotor 20 via bulkhead 30, using a plurality of bolts or other fasteners (not shown) received in an array of holes 80 through hub 76, in the well known manner.

Figure 13:
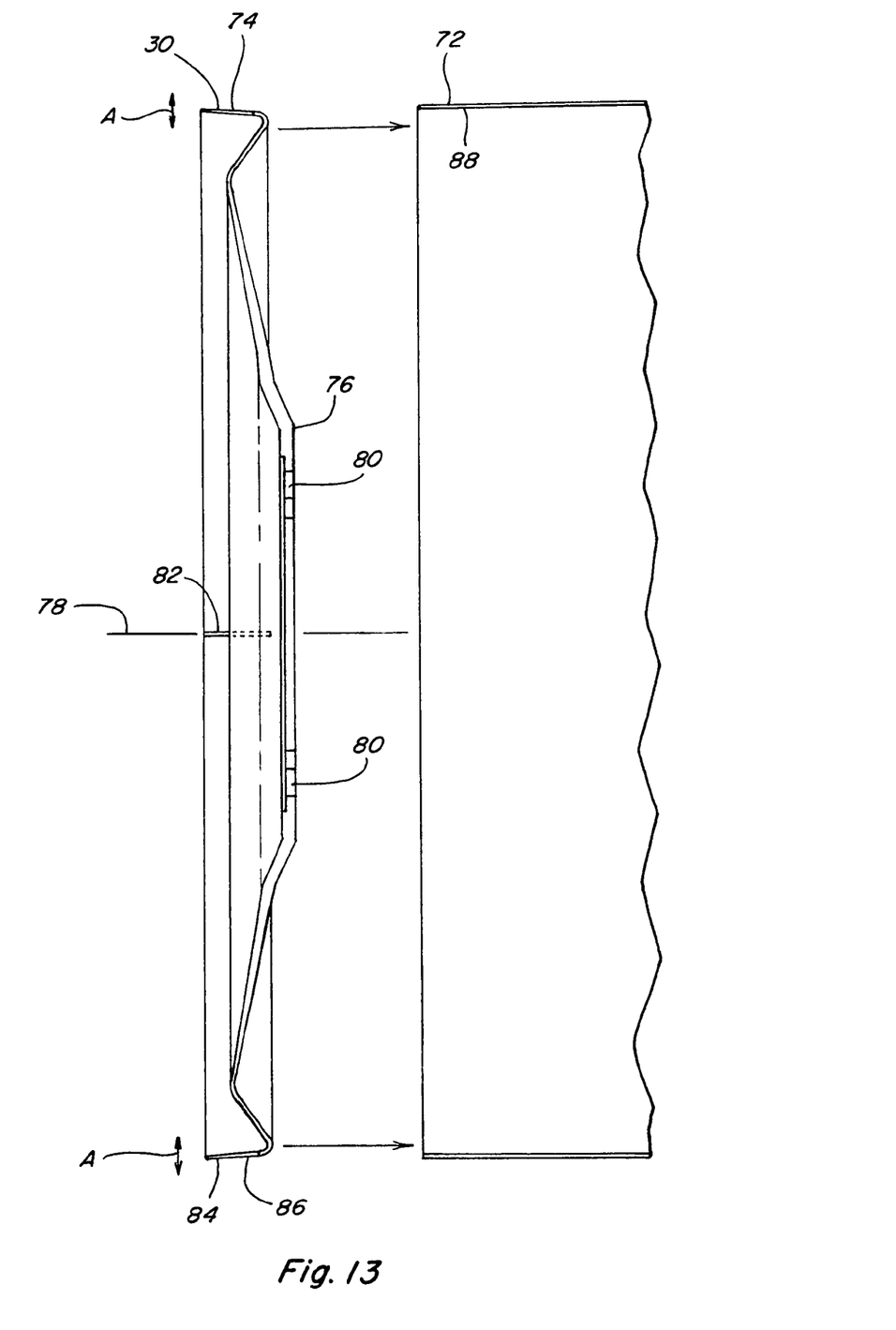
FIG. 13 is a fragmentary side view showing assembly of the bulkhead and the body segment of the rotor of the invention.

Skirt 74 can be a rigid structure for shaping the end of the main body segment, or it can be configured so as to be uniformly deformable or compliant in the radial direction to a limited extent, as illustrated by arrows A in FIG. 13. To facilitate this latter capability, a plurality of slots 82 can optionally be provided in skirt 74 at spaced locations around axis 78. This latter configuration enables bulkhead 30 to be positioned within a larger range of axial positions in relation to open end portion 72, for setting to or setting the length of the rotor. Skirt 74 has a radially outwardly facing peripheral surface 84 therearound which preferably has a tapered surface portion 86 positioned for engaging an opposing, radially inwardly facing peripheral surface 88 of main body segment 28. Tapered surface portion 86 and peripheral surface 88 are preferably each of sufficient axial length, for providing the capability of press fitting skirt 74 to specified axial location within open end portion 72, to enable the position of bulkhead 30 to establish the overall axial or longitudinal length of rotor 20, as represented by length 90 in FIG. 17. This can be in reference to a specified location, i.e., in relation to inlet segment 26 or another reference. Because skirt 74 of bulkhead 30 and the end of main body segment 28 are brought into conformance by the press fit therebetween, bulging, depressions and other irregularities and eccentricities that can result from using fasteners for attachment, are eliminated.

Figure 14:
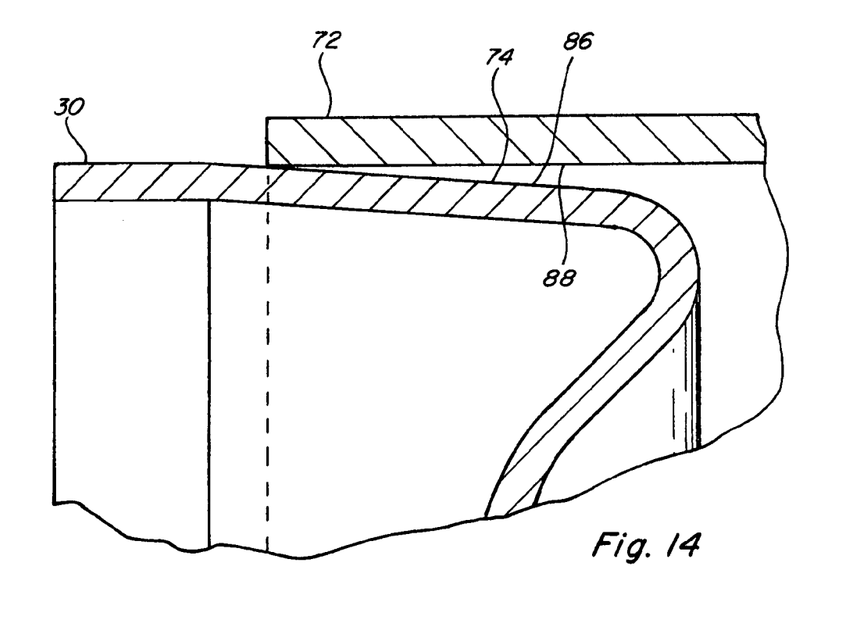
FIG. 14 is an fragmentary side view showing details of the press fit assembly of the bulkhead and the body segment of the rotor of the invention.
Figure 14A:
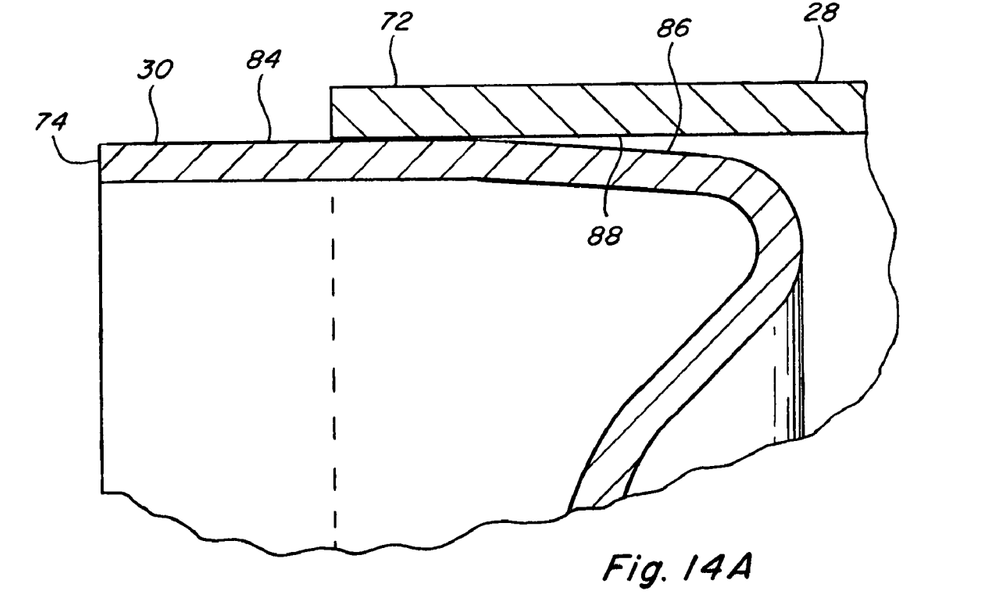
FIG. 14A is an another fragmentary side view showing the bulkhead and the body segment press fit together.
Figure 14B:
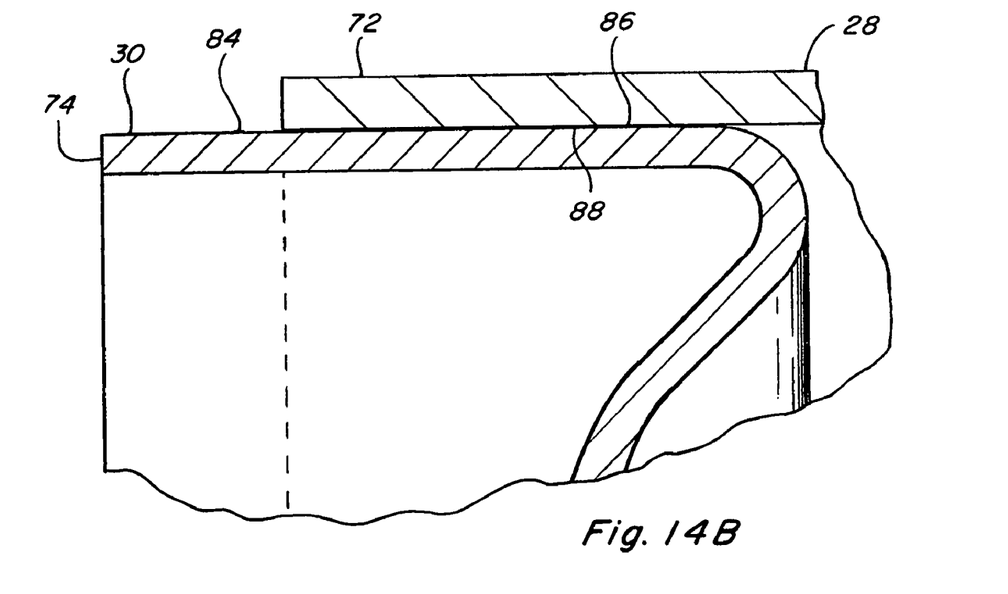
FIG. 14B is still an another fragmentary side view showing the bulkhead and the body segment press fit together.

FIG. 14A illustrates a representative press fit between a rigid skirt 74 and a conforming main body segment 28, and FIG. 14B illustrates a press fit involving a radially compressible skirt 74 and a relatively more rigid main body segment 28.

FIGS. 15 and 16 show apparatus 92 and 94, respectively, operable for press fitting inlet segment 26 and bulkhead 30 to main body segment 28. Each of the apparatus 92 and 94 is configured for holding inlet segment 26 and bulkhead 30 coaxial about a center coextensive with rotational axis 32, while they are press fit together, for instance, as driven by a hydraulic press 96, or the like. Apparatus 94 additionally includes structure for supporting and holding main body segment 28 in fixed position about axis 32, as illustrated.

Figure 17:
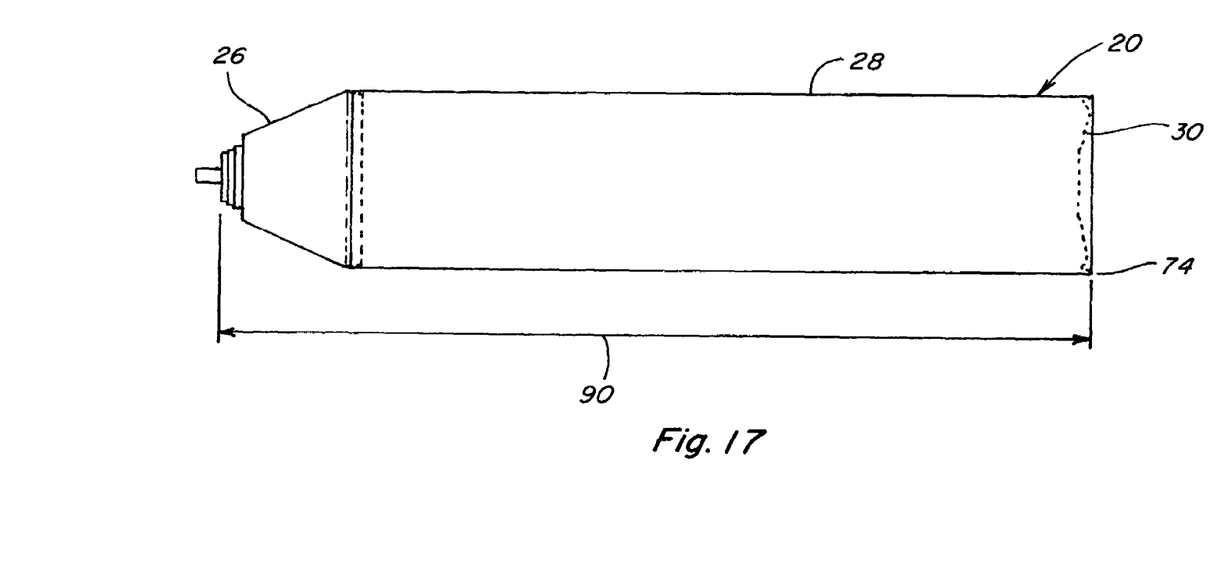
FIG. 17 is a side view showing another step of a method of making the rotor of the invention.

FIG. 17 illustrates rotor 20 having an overall length 90, as achieved by press fitting together of inlet segment 26, main body segment 28 and bulkhead 30, and welding or otherwise fixing them in that relationship according to the method of the present invention. It is contemplated that skirt 74 (FIG. 13) of bulkhead 30 can be provided with a sufficient axial length, such that a portion thereof may extend axially beyond the endmost edge of main body segment 30, so as to be capable of being cut to length for establishing the overall length of rotor 20.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. A method of making a rotor for a threshing system of an agricultural combine, comprising steps of:
providing an inlet segment having a rigid lip centered about a rotational axis, the lip having a predetermined shape and an axially tapered peripheral surface having a first predetermined transverse dimension measured through the rotational axis;
providing a tubular main body segment having a first open end portion and a second open end portion, the first open end portion being configured and sized to be press fit to the tapered peripheral surface of the lip of the inlet segment concentric about the rotational axis, and the first open end portion of the tubular main body segment being configured and sufficiently compliant so as to be conformable to the predetermined shape and transverse dimension of the lip when press fit thereto;

providing a disk shaped bulkhead including a center hub having a central axis therethrough and an outer skirt extending around the hub and centered about the axis therethrough, the outer skirt being configured to be press fit to the second open end portion of the main body segment; and assembling the inlet segment, the main body segment, and the bulkhead together, by press fitting the first open end portion of the main body segment onto the lip of the inlet segment so as to conform thereto, and by press fitting the skirt of the bulkhead to the second open end portion of the main body segment, such that the bulkhead, the main body segment and the inlet segment are concentric about the rotational axis.

2. The method of claim 1, wherein in the step of assembling, the skirt of the bulkhead is press fit to the second open end of the main body segment using an axially directed force of several thousand pounds.

3. The method of claim 1, wherein the skirt has a peripheral surface having a tapered shape configured for cooperatively engaging the second open end portion of the main body segment when the skirt is press fit thereto.

4. The method of claim 3, wherein in the step of assembling, the skirt of the bulkhead is press fit to the second open end portion of the main body segment in predetermined axial relation to the inlet segment for establishing an axial length dimension of the rotor.

5. The method of claim 3, wherein the skirt of the bulkhead is radially deformable so as to conform to a shape of the second open end portion of the main body segment when press fit thereto.

6. The method of claim 3, wherein the peripheral surface of the skirt is radially outwardly facing and is cooperatively receivable in the second open end portion of the main body segment.

7. The method of claim 1, comprising a step of providing an apparatus configured for holding the inlet segment, the main body segment, and the bulkhead concentric about the rotational axis, and wherein the step of assembling includes using the apparatus for press fitting the inlet segment, the main body segment, and the bulkhead together.

8. The method of claim 1, comprising a step of cutting the skirt of the bulkhead after being press fit to the second open end portion of the main body segment, for establishing an overall axial length of the rotor.

9. The method of claim 1, wherein the axially tapered peripheral surface of the lip is radially outwardly facing and is cooperatively receivable in the first open end portion of the main body segment.

10. A rotor for a threshing system of an agricultural combine, made by a process comprising steps of:

providing an inlet segment having a rigid lip centered about a rotational axis, the lip having a predetermined shape and an axially tapered peripheral surface having a first predetermined transverse dimension measured through the rotational axis;

providing a tubular main body segment having a first open end portion and a second open end portion, the first open end portion being configured and sized to be press fit to the tapered peripheral surface of the lip of the inlet segment for securely joining the inlet segment and the main body segment together concentric about the rotational axis, and the first open end portion of the tubular main body segment being configured and sufficiently compliant so as to be conformable to the predetermined shape and transverse dimension of the lip when press fit thereto;

providing a disk shaped bulkhead including a center hub having a central axis therethrough and an outer skirt extending around the hub and centered about the axis therethrough, the outer skirt being configured to be press fit to the second open end portion of the main body segment; and assembling the inlet segment, the main body segment, and the bulkhead together, by press fitting the first open end portion of the main body segment onto the lip of the inlet segment so as to conform thereto, and by press fitting the skirt of the bulkhead to the second open end portion of the main body segment, such that the bulkhead, the main body segment and the inlet segment are concentric about the rotational axis.

11. The rotor of claim 10, wherein in the step of assembling, the skirt of the bulkhead is press fit to the second open end of the main body segment using an axially directed force of several thousand pounds.

12. The rotor of claim 10, wherein the skirt has a peripheral surface having a tapered shape configured for cooperatively engaging the second open end portion of the main body segment when the skirt is press fit thereto.

13. The rotor of claim 12, wherein the peripheral surface of the skirt is radially outwardly facing and is cooperatively receivable in the second open end portion of the main body segment.

14. The rotor of claim 10, wherein in the step of assembling, the skirt of the bulkhead is press fit to the second open end portion of the main body segment in predetermined axial relation to the inlet segment for establishing an axial length dimension of the rotor.

15. The rotor of claim 10, wherein the skirt of the bulkhead is radially deformable so as to conform to a shape of the second open end portion of the main body segment when press fit thereto.

16. The rotor of claim 10, wherein the process additionally comprises a step of providing a fixture configured for holding the inlet segment, the main body segment, and the bulkhead concentric about the rotational axis, and wherein the step of assembling includes using the fixture for press fitting the inlet segment, the main body segment, and the bulkhead together.

17. The rotor of claim 10, comprising a step of cutting the skirt of the bulkhead after being press fit to the second open end portion of the main body segment, for establishing an overall axial length of the rotor.

18. The rotor of claim 10, wherein the axially tapered peripheral surface of the lip is radially outwardly facing and is cooperatively receivable in the first open end portion of the main body segment.

19. A method of making a rotor for a threshing system of an agricultural combine, comprising steps of:

providing an inlet segment having a frusto-conical portion extending in one direction and a circumferential lip extending in an opposite second direction, the frusto-conical portion and the lip being concentric about a rotational axis extending in the first and second directions, the lip including a tapered outer circumferential surface portion having a predetermined diametrical extent;

providing a tubular main body segment having a first open end portion and a second open end portion, at least the first open end portion including an inner circumferential surface therearound having a diametrical extent about equal to the predetermined diametrical extent of the tapered outer circumferential surface portion;

providing a disk shaped bulkhead including an outer skirt extending therearound, the outer skirt having an outer circumferential surface portion having a predetermined diametrical extent marginally larger than an inner diametrical extent of the second open end portion, the outer skirt being compressible radially inwardly substantially uniformly therearound;

assembling the inlet segment and the main body segment by press fitting the lip of the inlet segment into the first open end of the main body segment such that the inner circumferential surface is conformingly engaged with the tapered outer circumferential surface for holding the tubular main body segment substantially concentric with the frusto-conical portion and the lip; and assembling the main body segment and the bulkhead by press fitting the bulkhead into the second open end of the main body segment such that the outer skirt is radially compressed thereby for holding the bulkhead substantially concentric with the tubular body segment, the frusto-conical portion, and the lip.

20. The method of claim 19, wherein the outer circumferential surface of the outer skirt has a tapered shape.

21. The method of claim 19, wherein the predetermined diametrical extent of the outer circumferential surface of the skirt is about equal to the predetermined diametrical extent of the tapered outer circumferential surface portion of the lip.

22. The method of claim 19, wherein the process comprises another step of providing an apparatus for assembling the main body segment and the bulkhead, the apparatus being capable of holding the bulkhead concentric with the inlet segment as the bulkhead is inserted into the second open end of the main body segment.

23. The method of claim 19, wherein the process comprises an additional step of trimming the skirt of the bulkhead to set an overall axial length of the rotor.

* * * * *